United States Patent [19]

Brienza

[11] Patent Number: 5,066,133
[45] Date of Patent: Nov. 19, 1991

[54] EXTENDED LENGTH EMBEDDED BRAGG GRATING MANUFACTURING METHOD AND ARRANGEMENT

[75] Inventor: Michael J. Brienza, Easton, Conn.
[73] Assignee: United Technologies Corporation, Hartford, Conn.
[21] Appl. No.: 600,645
[22] Filed: Oct. 18, 1990
[51] Int. Cl.⁵ .............................................. G02B 5/18
[52] U.S. Cl. .................................... 359/570; 359/566; 385/37
[58] Field of Search ................... 350/3.61, 3.7, 96.11, 350/96.19, 162.17, 162.2, 162.21; 356/32

[56] References Cited

U.S. PATENT DOCUMENTS

| | | | |
|---|---|---|---|
| 4,093,339 | 6/1978 | Cross | 350/3.7 |
| 4,286,838 | 9/1981 | Huignard et al. | 350/96.11 |
| 4,400,056 | 8/1983 | Cielo | 350/96.19 |
| 4,653,906 | 3/1987 | Dunphy et al. | 356/32 |
| 4,725,110 | 2/1988 | Glenn et al. | 350/3.61 |
| 4,795,226 | 1/1989 | Bennion et al. | 350/162.2 |
| 4,807,950 | 2/1989 | Glenn et al. | 350/3.61 |
| 4,986,623 | 1/1991 | Sorin | 350/162.2 |

Primary Examiner—Bruce Y. Arnold
Assistant Examiner—J. P. Ryan
Attorney, Agent, or Firm—Peter R. Ruzek

[57] ABSTRACT

An arrangement for forming an extended length light redirecting embedded grating in an elongated solid material optical waveguide includes a source that directs a coherent light beam of a frequency in the ultraviolet range in a primary path transversely toward the waveguide. A section of a diffraction grating extends through the primary path at a spacing from the waveguide, and the diffraction grating has a dimension normal to the primary path that exceeds the corresponding dimension of the primary path. Relative movement is effectuated between the waveguide and diffraction grating in unison, and the primary path, so that the light beam is diffracted at the diffraction grating into two mutually frequency shifted partial light beams propagating in diverging secondary paths. The partial light beams are caused to travel toward a shared location of the waveguide where they form an interference pattern that moves longitudinally of the waveguide but respective high intensity fringes of which extend through the waveguide at respective positions that are stationary relative to the waveguide to effect refractive index changes at such positions along an extended length of the waveguide.

10 Claims, 1 Drawing Sheet

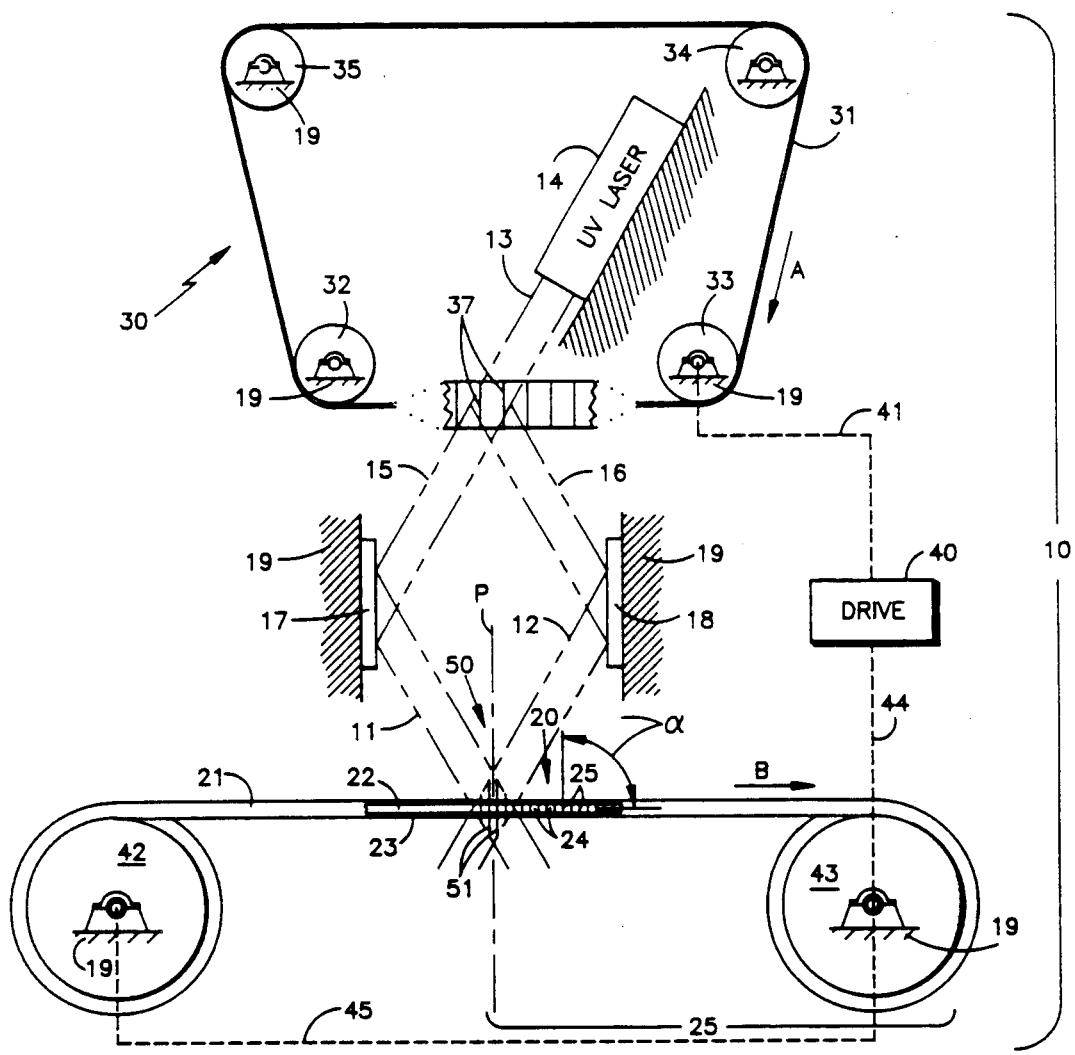

EXTENDED LENGTH EMBEDDED BRAGG GRATING MANUFACTURING METHOD AND ARRANGEMENT

DESCRIPTION

1. Technical Field

The present invention relates to optical waveguides, especially fibers, that are provided with embedded light redirecting Bragg gratings, and more particularly to a method of and apparatus for producing such gratings in optical waveguides.

2. Background Art

There are already known various constructions of optical waveguides, including optical fibers, which are provided with embedded gratings that are being used either for reflecting light back toward its source, or for inserting light into or for removing light from the respective optical waveguide at an intermediate location or at different intermediate locations of the waveguide. So, for instance, it is disclosed in the commonly owned U.S. Pat. No. 4,725,110, issued on Feb. 16, 1988, that at least one periodic grating can be impressed into the core of an optical fiber by exposing the core through the optical fiber cladding to the interference pattern of two coherent ultraviolet light beams that are directed against the optical fiber at two angles relative to the fiber axis that supplement each other to 180°. This exposure of the optical fiber core material to the interference pattern results in permanent periodic changes in the index of refraction of such optical fiber core material. This, in turn, results in a situation where the grating elements cumulatively constituting the grating are oriented normal to the fiber axis so that, when used, the grating redirects, of the light launched into the fiber core for guided propagation therein in a propagation direction, only that light having a wavelength within a very narrow range around a central wavelength that depends on the instantaneous periodicity of the grating as influenced by the strains to which the grating is subjected. The redirected light is directed back along the fiber axis opposite to the original propagation direction so that such redirected light is guided in the core to the point at which the original light had been launched into the fiber core. The wavelength of such returned light can be detected to determine the magnitude of the aforementioned strains and thus of the external influences that have caused such strains. On the other hand, this grating is transparent to light at wavelengths outside the aforementioned narrow range so that it does not adversely affect (interfere with) the further propagation of such other light towards its original destination, that is, the optical fiber end that is remote from that into which the light was originally launched. It will be appreciated that, when the grating is produced in the manner disclosed in the above patent, the axial dimension of the affected portion of the optical fiber core, that is, of the embedded grating, is limited in that it cannot exceed the corresponding dimension of the interference pattern.

On the other hand, it has been disclosed in an article by K. O. Hill, Y. Fujii, D. C. Johnson and B. S. Kawasaki entitled "Photosensitivity in Optical Fiber Waveguides; Application to Reflection Filter Fabrication" and appearing in the Applied Physics Letters, Volume 32, pages 647 to 649 (1978) that it is possible to produce an embedded periodic grating in an optical fiber core by launching light of appropriate wavelengths into the two core ends for propagation in opposite axial directions with attendant interference and refractive index changes at high-intensity regions of the resulting interference pattern. However, it may be seen that this approach has its limitations as well in that it is not only incapable of making the grating other than retroreflecting but also is not suited for forming the grating exclusively in an optical fiber core portion the axial length of which is less than the entire axial length of the core.

Yet, especially since the amount of light redirected by the grating depends on the axial length of such grating, it would often be desirable to give such a grating an axial length which, on the one hand, is extended relative to that obtainable in accordance with the above patent to thereby increase the amount of the redirected light within the aforementioned narrow wavelength range and thus, for instance, to improve the accuracy of detection of such redirected light, but, on the other hand, is shorter than (such as only a small fraction of) the overall length of the optical fiber core or a similar optical waveguide so as to be compatible with the area at which the external conditions, and thus the strains imposed thereby on the optical waveguide, are to be measured. Unfortunately, for reasons that ought to be obvious, neither one of the above approaches is capable of achieving this desirable result.

Moreover, there is a pronounced need for embedded gratings consisting of grating elements all extending at the same acute angle with respect to the optical waveguide axis, inasmuch as gratings of this type can be used for tapping light of a wavelength within a narrow range about a central frequency dependent on the grating periodicity out of, or inserting such into, the optical waveguide, at a location or a plurality of locations remote from the waveguide ends. The extended grating length would be particularly useful in this context since it would increase the intensity of light tapped out of or inserted into the waveguide at the particular location. Yet, the approach to the production of the embedded grating as disclosed in the above patent is not suited without significant modification, and that described in the above article is not suited at all, for producing embedded gratings whose grating elements would be oriented other than normal to the optical fiber axis.

Accordingly, it is a general object of the present invention to avoid the disadvantages of the prior art.

More particularly, it is an object of the present invention to provide an optical waveguide with an embedded light redirecting grating which does not possess the disadvantages of the known gratings of this kind.

Still another object of the present invention is to develop an arrangement for producing optical waveguide embedded gratings of the type here under consideration, which arrangement is capable of giving the grating any desired axial length in excess of the corresponding dimension of the interference pattern used to produce the grating and less than the entire length of the waveguide.

It is yet another object of the present invention to devise the above arrangement in such a manner as to be able to select the length and location of the grating relative to the waveguide, and/or the inclination of the grating elements thereof relative to the optical waveguide axis, as desired.

Yet another object of the present invention is to design the arrangement of the above type in such a manner as to be relatively simple in construction, inexpensive to manufacture, easy to use, and yet reliable in operation.

A concomitant object of the present invention is to develop a method of forming the extended length embedded grating in the optical waveguide, which method is highly efficient and reliable.

DISCLOSURE OF THE INVENTION

In keeping with these objects and others which will become apparent hereafter, one feature of the present invention resides in an arrangement for forming an extended length light redirecting embedded grating in an elongated solid material optical waveguide. The arrangement includes means for so supporting the optical waveguide on a support with the longitudinal axis extending in a predetermined direction 50 that a portion thereof is situated at a predetermined location and means mounted on the support for directing a coherent light beam of a frequency in the ultraviolet range in a predetermined primary path transversely toward the waveguide. According to the present invention, this arrangement further includes a diffraction grating so supported on the support that a section thereof extends through a zone of the primary path that is disposed at a predetermined spacing from the waveguide. This diffraction grating has a dimension normal to the primary path that exceeds the corresponding dimension of the primary path. There is further provided means for effectuating relative movement along the aforementioned direction between the portion and section in unison, on the one hand, and the primary path, on the other hand, with attendant diffraction of the light beam at the diffraction grating into two mutually frequency shifted partial light beams propagating in diverging secondary paths beyond the diffraction grating and toward the waveguide with at least one of the secondary paths being aimed at a region remote from the location. This arrangement also includes means so mounted on the support 50 as to be stationary relative to the directing means and interposed between the diffractive grating and the waveguide for causing at least the other of the partial light beams to travel toward the location, with the attendant formation of an interference pattern that moves relative to the portion but has respective high intensity fringes which extend through the waveguide at respective positions that are stationary relative to the waveguide to effect refractive index changes at such positions along a length of the waveguide that exceeds that of the portion.

Another aspect of the present invention is constituted by a method of forming an extended length light redirecting embedded grating in an elongated solid material optical waveguide having a longitudinal axis, this method including the steps of supporting the optical waveguide on a support in such a manner that the longitudinal axis thereof extends in a predetermined direction and that a portion of the waveguide is situated at a predetermined location; directing a coherent light beam of a frequency in the ultraviolet range in a predetermined primary path transversely toward the waveguide; supporting a diffraction grating on the support such that a section thereof extends through a zone of the primary path that is disposed at a predetermined spacing from the waveguide, with the diffraction grating having a dimension normal to the path that exceeds the corresponding dimension of the path; effectuating relative movement along the aforementioned direction between the portion and section in unison, on the one hand, and the primary path, on the other hand, with the attendant diffraction of the light beam at the diffraction grating into two mutually frequency shifted partial light beams which propagate in diverging secondary paths beyond the diffraction grating and toward the waveguide with at least one of the secondary paths being aimed at a region remote from the location; and causing at least the other of the partial light beams to travel toward the location with attendant formation of an interference pattern that moves relative to the portion but has respective high intensity fringes which extend through the waveguide at respective positions that are stationary relative to the waveguide to effect refractive index changes at such positions along a length of the waveguide that exceeds that of the portion.

BRIEF DESCRIPTION OF THE DRAWING

The present invention will be described in more detail below with reference to the sole FIGURE of the accompanying drawing, which is a somewhat simplified and partly diagrammatic side elevational view of an example of optical arrangement constructed in accordance with the present invention to produce an embedded grating in an extended length grating region of a solid optical waveguide constituted by an optical fiber core.

BEST MODE FOR CARRYING OUT THE INVENTION

Referring now to the sole FIGURE of the drawing in detail, it may be seen that the reference numeral 10 has been used therein to identify an extended length embedded grating producing arrangement of the present invention in its entirety. The arrangement 10 as illustrated is capable of being used to produce such embedded gratings in different types of solid material optical waveguides; however, for ease of explanation and understanding, it will be discussed below only as employed to produce an embedded grating 20 of the kind here under consideration in an uncoated optical fiber 21, and more particularly in a core 22 thereof that is surrounded by a cladding 23.

As will be discussed in more detail below, the grating 20 produced in accordance with the present invention is constituted by a multitude of grating elements 24 that are longitudinally equidistantly spaced within a grating region 25 and that, for illustrative purposes, are delimited in the drawing by otherwise imaginary grating lines 26 which are merely representative of loci exhibiting the same refractive index, with the spacing between such lines 26 being much grater than it is in reality.

The method employed in accordance with the present invention for producing the grating elements 24 in the grating region 25 of the optical fiber core 22, and the equipment being used for performing this method, are based on but constitute modifications of the method and arrangement that are disclosed in the aforementioned U.S. Pat. No. 4,725,110, so that the principles that the present invention share therewith will be discussed first; yet, the remainder of the disclosure of the above patent is incorporated herein by reference to the extent needed for understanding the background on which the present invention is based and for pointing out the improvement and advantages brought about by the present invention.

The core 22 of the waveguide or fiber 21, which is to be provided with a series of the embedded inclined Bragg redirection grating elements 24, is preferably of a germanium-doped silica or similar glass that is capable of having the grating elements 24 written, impressed or otherwise applied or embedded therein. As in the above patent, this grating element embedding is achieved by exposure of the optical fiber 21 to an interference pattern of two ultraviolet radiation beams. The thus produced periodic grating elements 24 are constituted by refractive index perturbations that are permanently induced in the optical fiber core 22 by exposure to ultraviolet radiation and that constitute optical discontinuities which scatter or redirect the light reaching the grating 20 during the use thereof, with only a minute fraction of such light being redirected at each of the grating elements 24.

The grating 20 is formed in the grating region 25, using a first order absorption process, by transversely irradiating the fiber 21 with light in the ultraviolet absorption band of the core material. The grating 20 characterized by a specific selected grating element spacing is formed by illuminating the core 22 from the side, preferably through the cladding 23 and without affecting the latter, by using two mutually coherent partial light beams 11 and 12 incident on the optical fiber 21 at respective incidence angles that are symmetric with respect to a reference plane P that includes an angle $\alpha$ with the longitudinal axis of the fiber core 22. The incidence angles are such that respective intensity peaks of the interference pattern resulting from interference of the coherent incident beams 11 and 12 extend at the aforementioned angle $\alpha$ into and through the optical fiber 21 and such that the spacing or periodicity of such interference pattern intensity peaks as considered in the axial direction of the core 22 is as desired for the purpose for which the grating 20 is being made. The grating element periodicity is selected by appropriately choosing the incidence angles for the selected wavelength of the ultraviolet radiation and the angle $\alpha$ is set by appropriately positioning the arrangement 10 relative to the optical fiber 20. Such optical fiber core exposure induces permanent refractive index changes in the affected grating region 25 of the optical fiber core 22, in effect creating a phase grating which is effective, subsequent to its formation, for redirecting light reaching the same. As shown, the angle $\alpha$ is 90°, resulting in backscattering or retroreflection of light propagating through the core 22, but it could be oblique if it were desired for the grating 20 to redirect light reaching the grating region 25 during the use of the fiber 21 into and/or out of the fiber 21. The same effect is also achieved when, as also contemplated, the entire arrangement 10, and thus the aforementioned plane of symmetry P, is turned relative to the fiber 21 about the intersection line of such symmetry plane P with the plane of the drawing.

As alluded to before, each of the grating elements 24 redirects only a minuscule fraction of the light reaching the same while the optical fiber 21 is in use. Yet, the cumulative effect of the grating elements 24 is the redirection of a significant proportion of the light the wavelength of which is in a very narrow range around a center wavelength that is in a predetermined ratio to the periodicity of the grating elements 24. This is so because only the light redirected at each of the grating elements 24 which has a frequency within this narrow range interferes constructively upon redirection.

For obvious reasons, the intensity of such constructively interfering redirected light increases with the increasing number of the grating elements 24, that is, with the length of the grating region 25. Yet, as already mentioned before, when using the arrangement and method disclosed in the above patent for grating inscription, the grating region length is limited to the axial dimension of the interference pattern. This is so because, given the fact that the grating inscription arrangement must be stationary relative to the fiber during the inscription operation to avoid smearing, and given the vagaries of light coherence and mechanical repositioning, it is impossible to extend the grating length by successive exposures of adjacent or overlapping portions of the fiber 21 and still obtain in-phase alignment between and/or among the thus obtained adjacent or overlapping gratings, which alignment would be necessary for the grating elements of such separate gratings to act in concert with one another.

As will become clearer later, the arrangement 10 constructed in accordance with the present invention avoids this drawback in that it is capable of giving the grating region 25 any arbitrarily chosen length, usually less than the entire length of the fiber 21 and often only a fraction of the latter, but in any event in excess of the axial dimension of the interference region at the fiber 21. The arrangement still produces a multitude of the grating elements 24 each extending at substantially the same angle $\alpha$ with respect to the longitudinal axis of the core 22 and all exhibiting the same periodic behavior or properties, and the grating lines 26 are still spaced the same distance from one another as considered in the longitudinal direction of the optical fiber 21. However, as a result of the increased length of the grating region 25, the number of the grating elements 24 that are encountered in the grating region 25 is now considerably increased and, consequently, the intensity of the redirected light that constructively interferes during the use of the grating 20 is also significantly increased.

In accordance with the present invention, this result is achieved in that, while the two interfering incident beams 11 and 12 are still preferably derived from a single beam 13 issued by an ultraviolet radiation source 14, such as a laser, (to assure their mutual coherence at all times of interest), a Doppler effect inscription grating device 30 is now being used for splitting the primary beam 13, which travels in a primary path, into two partial secondary beams 15 and 16 which eventually become the partial beams 11 and 12, respectively. As illustrated, the partial secondary beams 15 and 16 are converted into the partial beams 11 and 12 by reflection from respective mirrors 17 and 18. In the illustrated construction, the mirrors 17 and 18 are mounted on a stationary support 19 which also supports the ultraviolet radiation source or laser 14 in such a manner that the laser 14, and thus the path of travel of the primary beam 13, maintain their positions with respect to the mirrors 17 and 18 constant.

The illustrated inscription grating device 30 includes an endless strip 31 that is shown to be trained in a taut continuous loop around cylindrical support elements 32 to 35, such as rollers, which are mounted on the support 19 for rotation about their respective axes of rotation. The roller 33 is shown to be driven by a drive 40, as indicated by a broken line 41 that is representative of the driving connection between the drive 40 and the roller 33, to advance the strip 31 in the direction of an arrow A. As indicated in an enlarged section of the strip 31 situated midway between the rollers 32 and 33, the strip 31 incorporates, preferably over its entire length, a diffractive inscription grating 36 that is represented in the drawing by demarkation lines 37 between individual grating elements.

During the aforementioned advancement of the strip 31, the primary beam 13 encounters the inscription grating 36 and the ultraviolet radiation thereof partially passes through the grating 36 (to form the partial secondary beam 15) and is partially redirected by the grating 36 (to form the redirected partial secondary beam 16). This action of the grating 36 on the ultraviolet radiation of the primary beam 13 is a direct result of the optical properties of the aforementioned grating 36 in the strip 31. Moreover, as the ultraviolet radiation penetrates the strip 31 while the latter is moving, the frequency of a portion of such radiation is shifted, as a result of encounter with the moving inscription grating 36 and due to Doppler effect, by an amount proportional to the speed of movement of the inscription grating 36 through the primary beam 13. The frequency shifted ultraviolet radiation portion (first order) is then redirected by the grating 36 into the path of the secondary partial beam 16, while the remainder (zero order) of the radiation continues its travel into the path of the secondary partial beam 15. Then, as already indicated above, the passing and redirected secondary beams 15 and 16 are reflected by the spaced parallel reflectors 17 and 18 to constitute, following such reflections, the incident beams 11 and 12 which retain, except for their respective directions, the characteristics of the secondary beams 15 and 16.

The incident beams 11 and 12 then intersect and interfere with one another at an interference region 50 which, owing to the fact that the laser 14 and the reflectors or mirrors 17 and 18, and thus the paths of the beams 13, 15, 16, 11 and 12, are stationary with respect to the support 19, is also stationary relative to the support 19. However, due to the movement of the grating 36 through the beam 13, respective high intensity fringes of the interference pattern, which are diagrammatically represented in the drawing by respective lines 51, move through the interference region 50 from left to right, as indicated by an arrow B, at a speed that is dependent on the speed of movement of the grating 36 relative to the primary beam 13. More particularly, in the illustrated construction of the arrangement 10, the speed of movement of such fringes 51 through the interference region as considered in the aforementioned axial direction B of the fiber 21 is the same as that of the advancement of the inscription grating 36 through the path of the primary beam 13 in parallelism with such axial direction B in the direction of the arrow A. Moreover, as the fringes 51 disappear one by one at the right-hand end of the interference region 50, new ones come into being at the left-hand end of the region 50, at exactly the same spacing from the preceding fringes 51 as the disappearing ones had from the succeeding fringes 51.

The arrangement 10 of the present invention then utilizes this phenomenon by causing the optical fiber 21 to move through the interference region 50 in the direction of the arrow B at exactly the same axial speed as the interference fringes 51. To this end, the optical fiber 21 is payed out, in the illustrated exemplary construction of the arrangement 10, from a cylindrical payout component 42 and is taken up by a cylindrical takeup component 43, each of which may be constituted by a reel or mandrel and both of which are mounted on the support 19 for rotation about their respective axes of rotation, such as to extend in a substantially taut manner between the two components 42 and 43 and especially through the interference region 50, and to move through the region 50 at the speed of movement of the interference fringes 51 therethrough. This is diagrammatically represented in the drawing by respective broken lines 44 and 45 that are indicative of mechanical torque-transmitting connections between the drive 40 and the respective components 42 and 43. However, it will be appreciated that, in order to achieve the required tautness of the fiber 21, it is not necessary to positively drive the payout component 42 and, as a matter of fact, this could be counterproductive. Rather, the rotation of the component 42 could be merely retarded by an appropriate brake or the like.

When the grating elements 24 are produced in this manner, consecutive ones of the grating elements 24 are present with the same periodic spacing throughout the grating region 25, regardless of the axial length of such region 25. On the other hand, the grating elements 24 are absent from regions of the fiber core 22 that are longitudinally consecutive with the respective ends of the grating region 25. This, of course, means that the light of a wavelength within the aforementioned narrow range is redirected by the grating 20 solely at the grating region 25 and not elsewhere in the optical fiber 21, thus avoiding unnecessary and highly undesirable optical power losses. Yet, because of the increased length of the grating region 25 relative to that obtained using the approach disclosed in the above patent, the amount or intensity of such redirected light is increased, thus improving the prospects for detection or further use of such redirected light.

Moreover, when the angle α of the grating elements 24 is oblique, the light that is redirected by the grating 20 from the core 22 during the use of the fiber 21, in addition to being more intense, propagates outside the optical fiber 21 along a single direction determined by the aforementioned oblique angle α, albeit with some fanning out in the circumferential direction, rather than all around the optical fiber 21; this facilitates the capture of the thus escaping light and increases the proportion of such light that is actually captured. By the same token, when coherent light is being launched into the optical fiber core 22, it is sufficient to direct all of the power of such light all over the grating region 25 along a single direction substantially coincident with the path of the beam 24 and including the requisite angle α with the longitudinal axis of the core 22, rather than having to distribute such power all around the optical fiber 21 and, to the extent that such power is carried by light having a wavelength within the aforementioned narrow range around the center wavelength, a meaningful proportion of such directed light power will be redirected into the core 22 for guided longitudinal propagation therein even though only a small portion of such light is redirected at each of the grating elements 24. This effect is attributable to the constructive interference between the partial light amounts which have been redirected at the respective grating elements 24 with the partial light amounts redirected at other longitudinally consecutive ones of the grating elements 24. Now, however, because of the increased axial length of the grating region 25 and the attendant increase in the number of the grating elements 24 present in the grating region 25, it is possible to insert more of such light into the core 22 by illuminating the optical fiber 21 over the entire (increased) axial length of the grating region 25.

The optical fiber 21 may be provided with more than the single grating region 25 described above. So, for instance, the periodicity and/or the angle α of each of such grating regions 25 may be different so that the central wavelength of the light redirected at each of such grating regions 25 out of or into the optical fiber core 22 and/or the angle of propagation of such light within or outside the optical fiber core 22 is correspondingly different. In any event, inasmuch as each of the grating regions 25 affects only light within the aforementioned narrow wavelength range (or of one polarization) that is different from that of the other grating region or regions 25 while being substantially transparent to light of any other wavelength (or polarization), the grating regions 25 need not be longitudinally spaced from one another; rather, they may partially overlap one another or even be coextensive with each other.

While the present invention has been illustrated and described as embodied in a particular construction of an optical waveguide and associated equipment for inscribing the phase grating therein, it will be appreciated that the present invention is not limited to this particular example. So, for instance, the grating inscription device 30 could include, instead of the endless strip 31, a plate-shaped grating element which would then be mounted on the support 19 for movement parallel to the direction of movement B of the optical fiber 21, and would be advanced by the drive 40 at the appropriate speed, all in any well known manner that need not be disclosed here. Also, the various components of the arrangement 10 could be positioned relative to the path of movement of the optical fiber 21 in such a manner that one of the partial secondary beams 15 and 16 would be directly aimed at the portion of the fiber 21 that is to be exposed to the action of the interference pattern. In this case, the corresponding mirror 17 or 18 would be dispensed with, and only the other one would redirect the other beam 16 or 15 toward such location to form the aforementioned interference pattern thereat. Therefore, the scope of protection of the present invention is to be determined solely from the attached claims.

I claim:

1. An arrangement for forming an extended length light redirecting embedded grating in an elongated solid material optical waveguide having a longitudinal axis, comprising:
   a support;
   means for supporting the optical waveguide on said support with the longitudinal axis extending in a predetermined direction such that a portion thereof is situated at a predetermined location;
   means mounted on said support for directing a coherent light beam of a frequency in the ultraviolet range in a predetermined primary path transversely toward the waveguide;
   a diffraction grating supported on said support such that a section thereof extends through a zone of said primary path that is disposed at a predetermined spacing from the waveguide, said diffraction grating having a dimension normal to said primary path that exceeds the corresponding dimension of said primary path;
   means for effectuating relative movement along said direction between, said portion and said section in unison, relative to said primary path, with attendant diffraction of said light beam at said diffraction grating into two mutually frequency shifted partial light beams propagating in diverging secondary paths beyond said diffraction grating and toward the waveguide with at least one of said secondary paths being aimed at a region remote from said location; and
   means, mounted on said support such as to be stationary relative to said directing means and interposed between said diffractive grating and the waveguide, for causing at least the other of said partial light beams to travel toward said location with attendant formation of an interference pattern having respective high intensity fringes which extend through the waveguide at respective positions that are stationary relative to the waveguide to effect refractive index changes at such positions along a length of the waveguide that exceeds that of said portion.

2. The arrangement as defined in claim 1, wherein said causing means includes at least one light redirecting element situated in at least one of said one secondary paths and operative for redirecting the light propagating therein toward said location.

3. The arrangement as defined in claim 2, wherein said redirecting element is a mirror.

4. The arrangement as defined in claim 2, wherein the other of said paths is aimed at a region that is remote from both said remote region and said location; and wherein said causing means further includes an additional light redirecting element situated in the other of at least one of said secondary paths and operative for redirecting the light propagating therein toward said location.

5. The arrangement as defined in claim 4, wherein said additional redirecting element is a mirror.

6. The arrangement as defined in claim 1, wherein said section of said diffraction grating extends along a plane that is substantially parallel to said direction.

7. The arrangement as defined in claim 1, wherein said directing means and said causing means are stationarily mounted on said support and said diffraction grating and the waveguide are so supported on said support as to enable said portion and said section to conduct said relative movement in unison with respect to said support.

8. The arrangement as defined in claim 7, wherein said diffraction grating is an endless diffraction grating strip; and wherein said effectuating means includes a plurality of cross-sectionally circular mounting elements rotatably mounted on said support and having said diffraction grating strip trained in a loop thereabout, and means for driving at least one of said mounting elements in rotation.

9. The arrangement as defined in claim 7 for use with an optical fiber as the waveguide, wherein said effectuating means includes first fiber handling means for paying out the fiber for travel toward said location, second fiber handling means for taking up the fiber after passing through said location, and means for so driving at least one of said first and second fiber handling means as to maintain the fiber length disposed therebetween in a substantially taut condition.

10. A method of forming an extended length light redirecting embedded grating in an elongated solid material optical waveguide having a longitudinal axis, comprising the steps of
   supporting the optical waveguide on a support in such a manner that the longitudinal axis thereof extends in a predetermined direction and such that a portion of the waveguide is situated at a predetermined location;

directing a coherent light beam of a frequency in the ultraviolet range in a predetermined primary path transversely toward the waveguide;

supporting a diffraction grating on the support such that a section thereof extends through a zone of the primary path that is disposed at a predetermined spacing from the waveguide, with the diffraction grating having a dimension normal to said primary path that exceeds the corresponding dimension of said primary path;

effectuating relative movement along said direction between said portion and said section in unison, and relative to the primary path, with attendant diffraction of the light beam at the diffraction grating into two mutually frequency shifted partial light beams propagating in diverging secondary paths beyond the diffraction grating and toward the waveguide with at least one of the secondary paths being aimed at a region remote from said location; and causing at least the other of the partial light beams to travel toward said location with attendant formation of an interference pattern having respective high intensity fringes which extend through the waveguide at respective positions that are stationary relative to the waveguide to effect refractive index changes at such positions along a length of the waveguide that exceeds that of said portion.

* * * * *